United States Patent

[11] 3,540,564

[72] Inventor H. Russell Brand
 62 S. Bay Drive, Massapequa, New York 11758
[21] Appl. No. 697,432
[22] Filed Jan. 12, 1968
[45] Patented Nov. 17, 1970

[54] VENDING MACHINE FOR DISPENSING RECTANGULAR AND CYLINDRICAL PRODUCTS THROUGH COMMON OPENING
 2 Claims, 13 Drawing Figs.
[52] U.S. Cl. .................................................. 194/79, 221/251, 221/289
[51] Int. Cl. ............................................... G07f 11/00
[50] Field of Search ......................................... 221/251, 298, 131, 133, 266, 261, 289; 194/80, 79

[56] References Cited
UNITED STATES PATENTS
| 579,330 | 3/1897 | Peterson | 194/79 |
| 798,626 | 9/1905 | Regan | 194/79 |
| 1,708,441 | 4/1929 | Cole | 194/79UX |
| 2,661,991 | 12/1953 | Petrecca | 221/289X |
| 2,903,155 | 9/1959 | Whitefield | 221/261X |
| 2,903,158 | 9/1959 | Howard | 221/261 |
| 497,906 | 5/1893 | Bettini | 194/80 |
| 1,275,153 | 8/1918 | Hartman | 194/80 |
| 1,356,345 | 10/1920 | Dun Lany | 221/298 |
| 1,713,333 | 5/1929 | Economos | 221/131 |
| 1,969,170 | 8/1934 | Erickson | 221/251 |
| 2,142,053 | 12/1938 | Hoban | 221/298 |
| 2,604,577 | 7/1952 | Strickland et al. | 221/298 |
| 2,957,605 | 10/1960 | Gabrialsen | 221/124 |
| 2,974,828 | 3/1961 | Matteson | 221/251 |
| 3,135,424 | 6/1964 | Peppler | 221/251 |

Primary Examiner—Samuel F. Coleman
Attorney—Alfred W. Barber

ABSTRACT: Rectangular and cylindrical products are stacked in adjacent columns and are dispensed by mechanically similar mechanisms. A coin deposited for purchase serves to engage the mechanism which prepares the way for delivery of the products. However, after this preparation, the delivery is effected on the return stroke of the delivery handle. Both rectangular and cylindrical products are delivered by mechanically similar means and delivery is completed through a common opening. Unauthorized repetition of delivery of products is virtually impossible due to the two step operation of the vending machine.

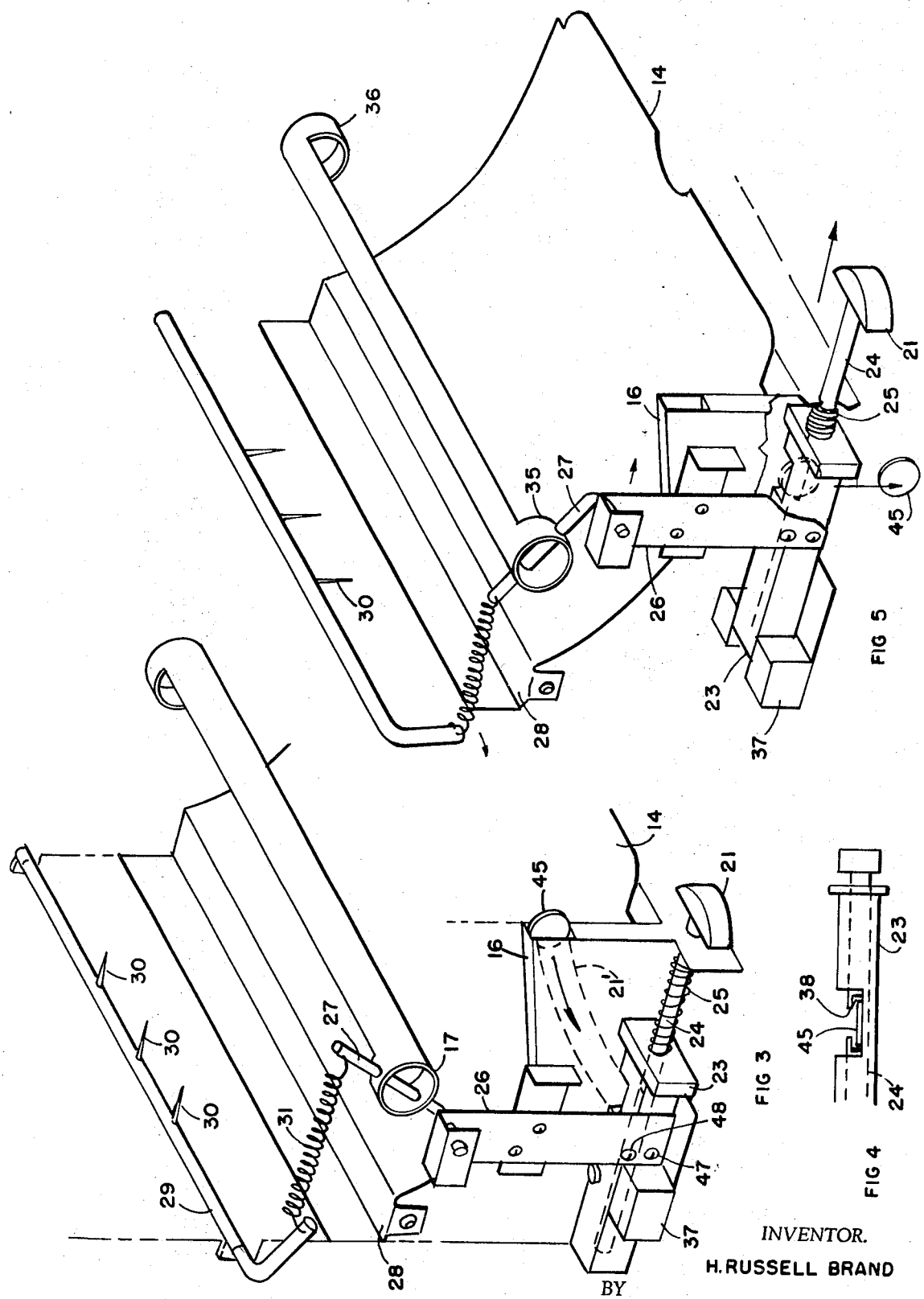

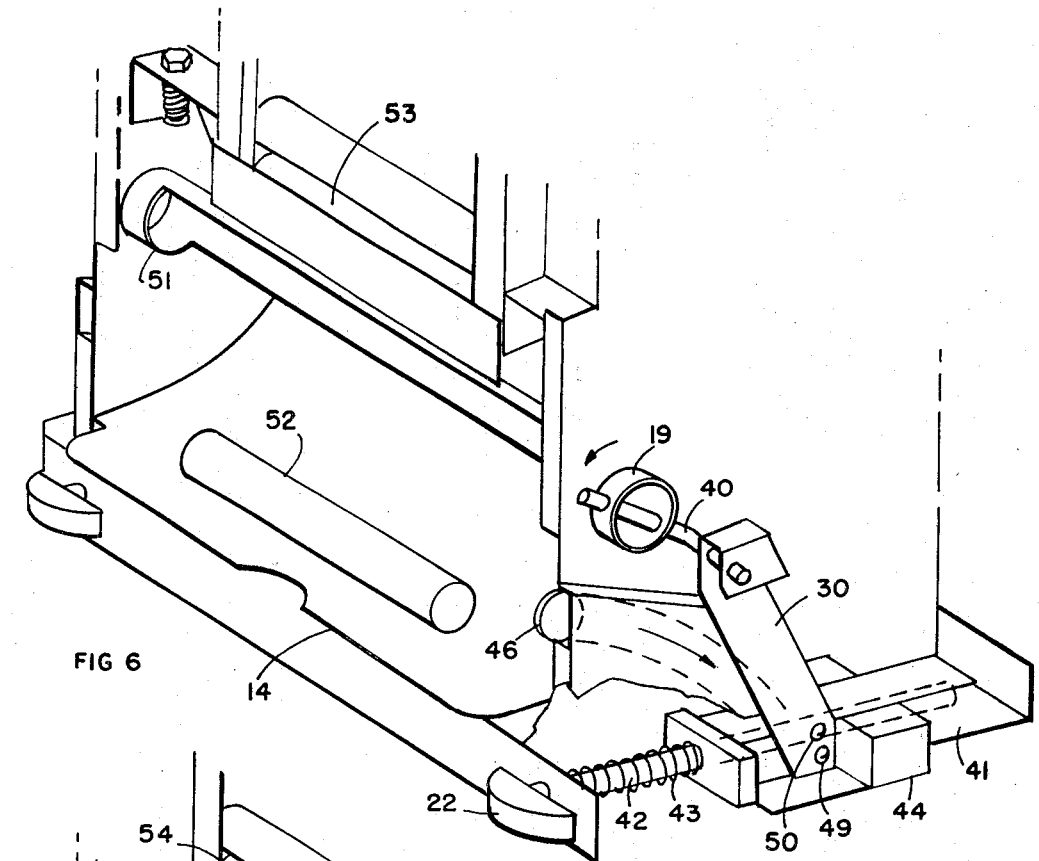
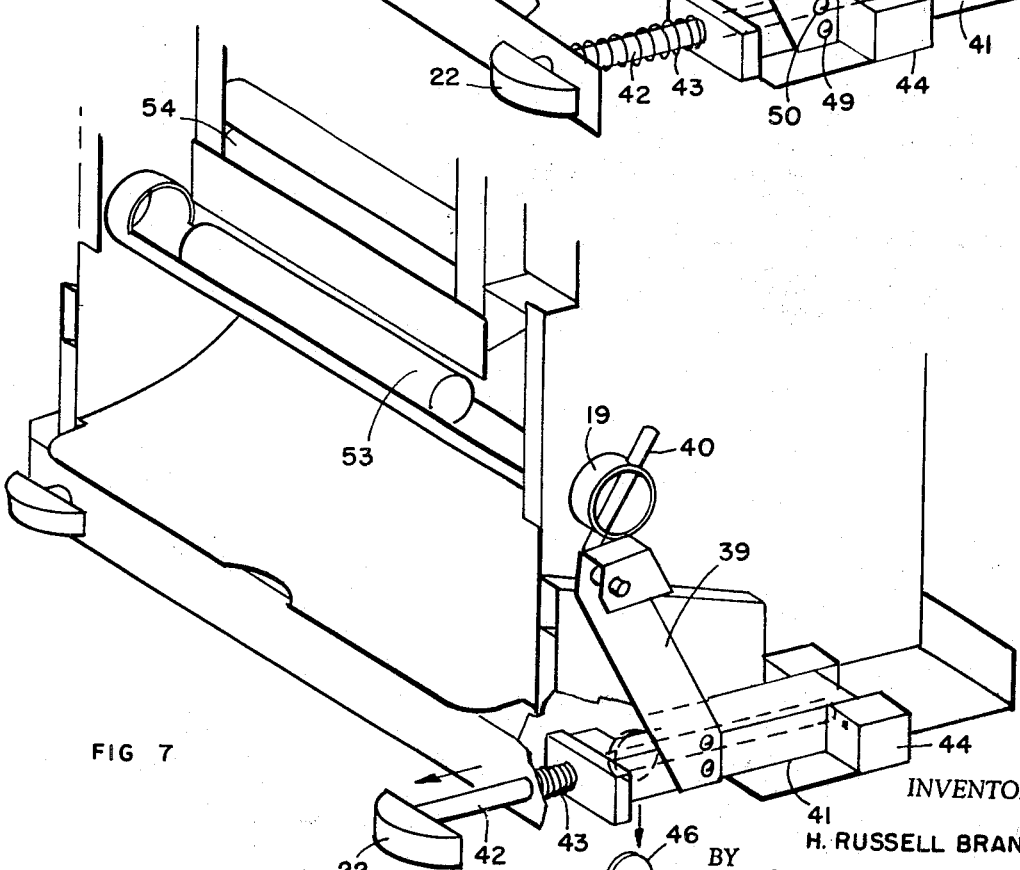

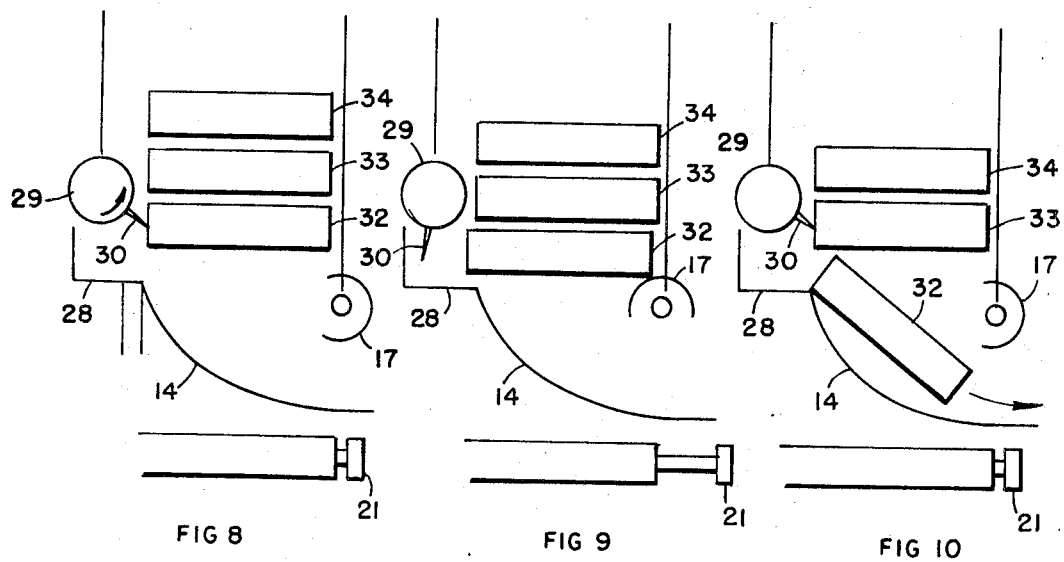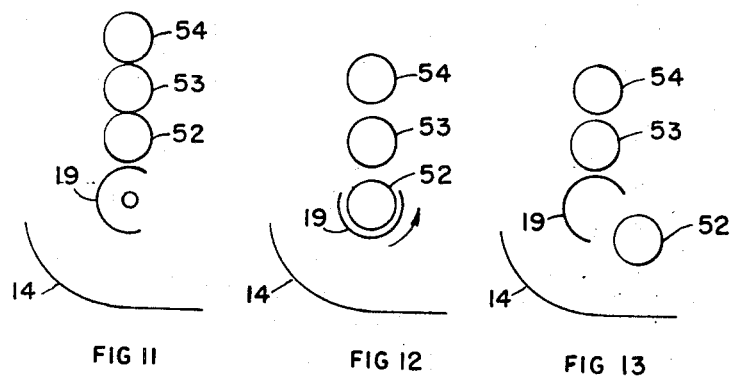

3,540,564

VENDING MACHINE FOR DISPENSING RECTANGULAR AND CYLINDRICAL PRODUCTS THROUGH COMMON OPENING

BACKGROUND OF THE INVENTION

1. Field of the Invention

The present invention may be considered as falling within the scope of Class 194, Check-Controlled Apparatus, Subclass 79, Article Delivery and/or Class 221, Article Dispensing, Subclass 251, with separate holdback means or Subclass 245, with return stroke inhibitor (*i.e.* full-stroke mechanism).

2. Description of the Prior Art

British Pat. No. 324,142 issued to Blair on Jan. 23, 1930 shows a vending machine for dispensing rectangular packages from a stack of such packages, U.S. Pat. No. 2,599,685 issued to Berger et al. on June 10, 1952 shows a vending machine for dispensing cylindrical packages from a stack of such packages. There is no suggestion as to how two machines, *i.e.* one dispensing rectangular packages and one dispensing cylindrical packages can be combined into one machine. Furthermore, it is not shown or suggested how the two dispensing mechanisms can be constructed of several of the same parts thereby reducing manufacturing costs and the number of different parts required.

SUMMARY

The vending machine in accordance with the present invention is simple, rugged and reliable using a minimum number of different parts. Rectangular and cylindrical packages are stored in adjacent vertical stacks thereby making efficient use of the space within the machine and storing a maximum number of packages in the storage space. Operation of the machine is in two steps: first, after a coin has been deposited, the operating handle is locked by the coin to the dispensing mechanism so that when it is pulled out, a package is dropped to delivery ready position; second, when the handle is pushed in, the coin is dropped into a collecting box and the package is dumped into a common delivery chute.

Accordingly, one object of the present invention is to provide a vending machine which uses a duplication of parts to deliver rectangular and cylindrical packages.

Another object is to provide a vending machine which uses the purchasing coin to lock the package delivery mechanism which in turn prepares the package for deliver.

Still another object is to provide a vending machine in which the operating handle must be pulled out with a coin mechanically engaging the delivery make-ready mechanism and in which the handle must be pushed in to complete delivery, the coin being released and collected at the instant the handle direction of travel is reversed.

A further object is to provide a vending machine which is simple to construct, uses a minimum number of different parts and which is rugged and reliable in operation.

A still further object is to provide a vending machine which cannot be "repeated" by maintaining pressure or pull on the operating handle.

These and other objects will be apparent from the detailed description of the invention given in connection with the drawings.

BRIEF DESCRIPTION OF THE DRAWINGS

FIGS. 3 and 5 are view of the rectangular package-vending portion of the vending machine illustrating the two steps of the operating cycle.

FIG. 4 is a detail of the coin lockup mechanism.

FIGS. 6 and 7 are view of the cylindrical package-vending portion of the machine illustrating the two steps of the operating cycle.

FIGS. 8, 9 and 10 are simplified schematic representations useful in explaining the operation of the machine in vending rectangular packages.

FIGS. 11, 12 and 13 are simplified schematic representations useful in explaining the operation of the machine in vending cylindrical packages.

FIG. 1 is a view in perspective of the operational assembly without an enclosing cabinet in order to more clearly show the mode of operation. The four major structural parts include a main upright channel 1-2-3 of bent sheet metal for holding a stack of rectangular packages; an auxiliary formed channel 5-6-7 for holding a stack of cylindrical packages; a bent sheet metal base 4; and a formed delivery chute 14. To permit easy filling of the rectangular package channel, the auxiliary channel is mounted on tabs 8 and 11 which are pivoted on mounting angle 9 and 12 by means of bolts 10 and 13. At the left side of the machine a pull handle 21 operates the rectangular package delivery mechanism including tube 17 secured by split washer 18 in response to a coin dropped into coin slot 16. At the right side of the machine a pull handle 22 operates a round package delivery mechanism including tube 19 in response to a coin dropped into coin slot 15.

FIG. 2 is a perspective view similar to that of FIG. 1 but taken from the left side rather than the right side. This view shows the left end of tube 19 secured by a split washer 20 and the projection of tube 17 through wall 3 of the rectangular package channel.

FIGS. 3, 4 and 5 shows the inner working mechanism with the channels removed for clarity. Handle 21 serves to pull a rod 24 passing through a central hole in actuating block 23 adapted to slide in and out past a guide block 37. When a coin 45 is deposited in coin slot 16, it passes down a chute 21' and if handle 21 is pushed all the way in, the coin lodges in a slot 38 (See FIG. 4) in rod 24 and locks rod 24 to actuating block 23. Now, when handle 21 is pulled out, arm 26, attached to block 23 by suitable means such as screws 47 and 48, is moved outwardly turning tube 17 by means of crank 27 through an angle of about 90 degrees, as shown in FIG. 5. In this position the cutout portion 35-36 points downward and the remaining portion of tube 17 forms a resting platform along with shelf 28 for a rectangular package 33 to be delivered. Package 33 is allowed to drop onto these resting means since the upper end of crank 27 is moved backward, relieving spring 31 so that rod 29 rotates clockwise removing retaining points 30 from package 33. When the operator starts to push handle 21 inwardly, coin 45 is released and drops to a collection tray, not shown. As handle 21 is pushed inward, a bar attached to rod 24 pushes block 23 backward carrying arm 26 back to the initial position shown in FIG. 2. As this is done, tube 17 is rotated clockwise and cutout 35-36 comes under the edge of package 33 allowing it to drop down the delivery chute 14. At the same time crank 27 pulls on spring 31 rotating rod 29 counterclockwise and so forcing retaining points 30 into the next remaining package 34 and thus retaining it and any packages stacked above it. When the handle 21 has been returned to the initial position as shown in FIG. 3, the vending machine is ready for another cycle of operation.

FIGS. 8, 9 and 10 show the two step delivery cycle in simplified form. FIG. 8 shows handle 21 in and rectangular packages restrained by retaining points 30. FIG. 9 shows the first step in which handle 21 is pulled out, points 30 retracted, tube 17 rotated and package 32 resting on tube 17 and shelf 28 ready for deliver. FIG. 10 shows the second step with handle 21 pushed in, points 30 restraining the packages 33, 34, tube 17 rotated allowing package 32 to fall into delivery chute 14.

FIGS. 6 and 7 show the similar operations which deliver cylindrical packages. The handle 22 on the right side of the machine carries a rod 42 passing through a central hole in actuating block 41 guided by block 44. Actuating arm 39 attached to block 41 by suitable means such as screws 49 and 50 moves forward when handle 22 is pulled out after a coin 46 has been deposited locking rod 42 to block 41 (as shown in FIG. 4). As arm 39 moves forward, crank 40 rotates tube 19 allowing a cylindrical package 53 to drop into the cutout portion 51. When handle 21 is pushed back in, to the initial position shown in FIG. 6, arm 39 rotates crank 40 and tube 19 counterclockwise dumping a cylindrical package 52 into the delivery chute 14. Coin 46 is dropped at the start of the return cycle shown in FIG. 7.

FIGS. 11, 12 and 13 illustrate the two step cycle accomplishing the delivery of cylindrical packages. In FIG. 11 the handle is in and the tube 19 is rotated to restrain the stack of cylindrical packages. FIG. 12 shows the first step of the cycle, the make-ready portion, with tube 19 rotated to receive a package 52 to be delivered. FIG. 13 shows the second step when the handle is pushed in, tube 19 turns the cutout forward dumping a package 52 into the delivery chute 14 and restraining the undelivered stack of cylindrical packages 53-54.

Figure 1:
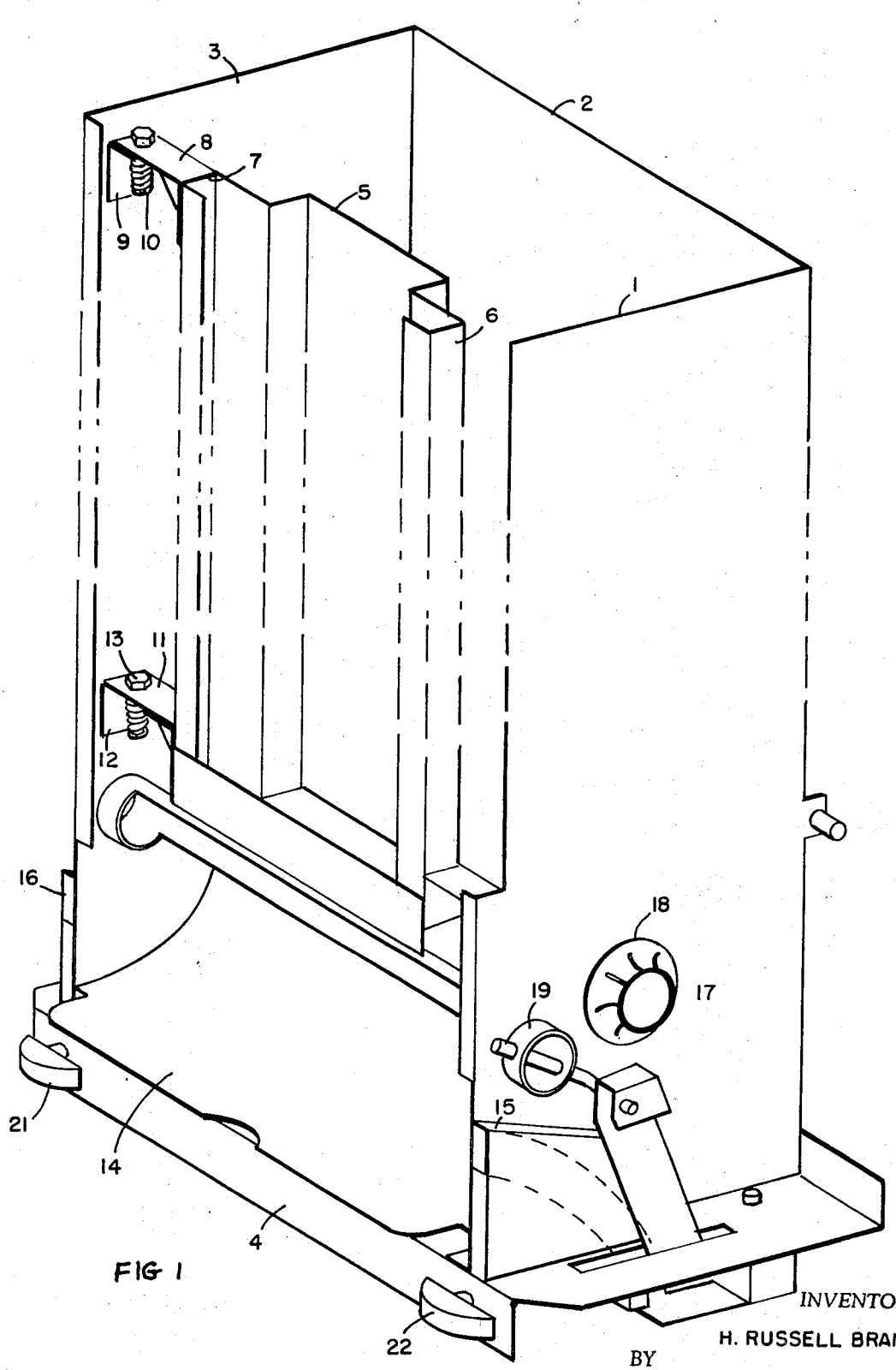
FIG. 1 is a general view in perspective of the operational assembly of a vending machine in accordance with the present invention.
Figure 2:
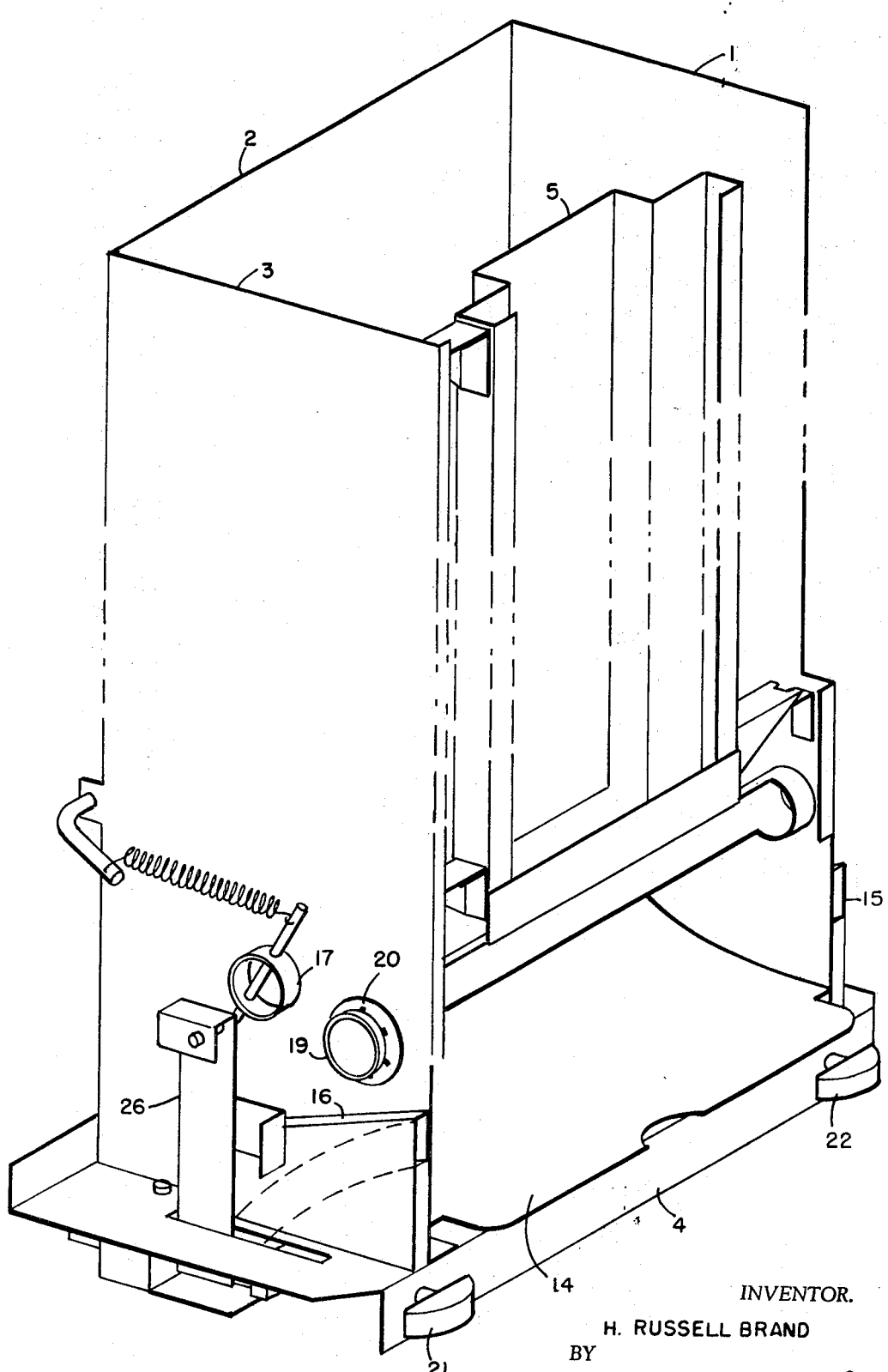
FIG. 2 is similar to FIG. 1 but viewed from a different angle.

I claim:
1. A coin-operated vending machine for dispensing rectangular and cylindrical packages comprising:
   a first tubular member open longitudinally along its side and pivoted to be rotatable about its axis for receiving a cylindrical package to be dispensed;
   a first manually operable plunger including a first coin slot;
   a linkage means coupled to said first tubular member for rotating said tubular member about its axis to dispense a package, said linkage means being connected to said first plunger for actuation after a coin is deposited in said first coin slot;
   a first coin shoot positioned to direct a deposited coin into said first coin slot;
   a second manually operated plunger including a second coin slot;
   a second coin shoot positioned to direct a deposited coin into said second coin slot; and
   second means coupled to said second plunger in response to a coin deposited in said coin slot for holding a stack of rectangular packages to be dispensed, said second holding means including similar second tubular member and a shoulder cooperating with said second tubular member to support said stack of rectangular packages to be dispensed.

2. The vending machine as recited in claim 1 wherein said second holding means additionally comprises a crank connected to said second tubular means, a pivotably supported rod having a plurality of retaining points for normal contact with the bottom rectangular package, and a spring coupled between said crank and said rod for pivoting said rod to disengage said retaining points from the bottom package upon manual operation of said second plunger.